Jan. 15, 1963  A. ROSS  3,074,014
PHASE INDICATING SPECTRUM ANALYZER
Filed May 20, 1960
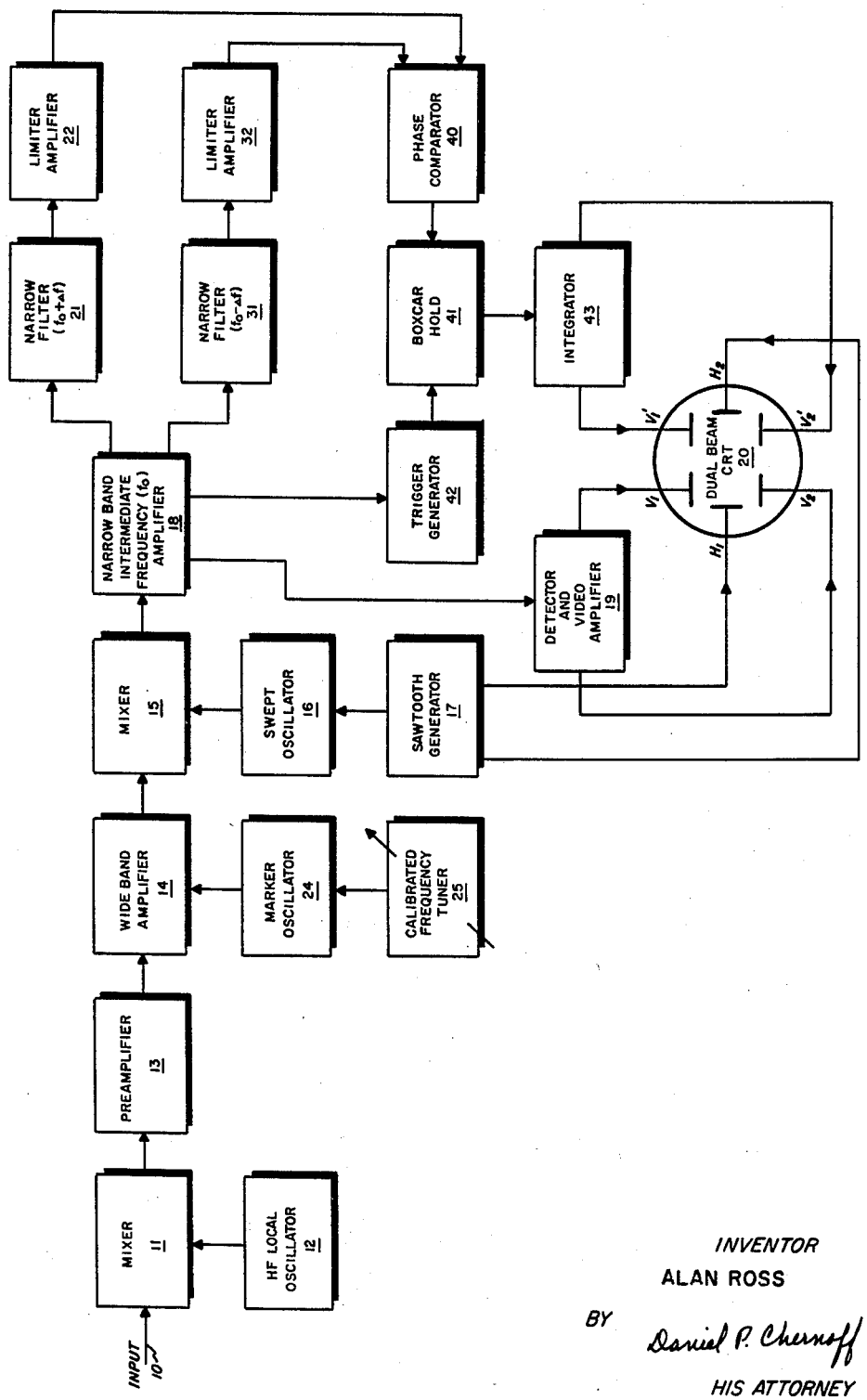
INVENTOR
ALAN ROSS
BY Daniel P. Chernoff
HIS ATTORNEY

United States Patent Office 3,074,014
Patented Jan. 15, 1963

3,074,014
PHASE INDICATING SPECTRUM ANALYZER
Alan Ross, Bayside, N.Y., assignor to Polarad Electronics Corporation, Long Island City, N.Y., a corporation of New York
Filed May 20, 1960, Ser. No. 30,526
8 Claims. (Cl. 324—77)

The present invention relates to spectrum analyzers for analyzing complex signals and more particularly to a spectrum analyzer wherein means are provided for indicating on the spectrum display the relative phase relationship of the signals analyzed.

Spectrum analyzers are useful devices in the study of electromagnetic signals and particularly for radio frequency signals in the microwave frequency range; by means of such analyzers complete and reasonably accurate panoramic representation of the amplitude or power of the various frequency components present in a complex signal may be obtained. In the conventional spectrum analyzer, however, only the absolute magnitude of the frequency spectrum of the signal is displayed and phase information is altogether disregarded by the detector.

It is intuitively apparent, however, that the phase spectrum contains information that is not necessarily present in the power spectrum of the signal and that the combination of the two into an integrated display would provide considerably more information about a given signal than either one alone. Accordingly, it is one of the objectives of the present invention to provide means for analyzing and displaying, in panoramic form, this phase information present in the incoming signal.

As may be shown by conventional Fourier analysis, a complex signal may be broken down into a number of components of different frequencies, each frequency having a particular associated amplitude and phase relative to the overall frequency spectrum of the signal. It would be desirable to produce a spectrum analyzer in which both the phase and amplitude spectrums of these frequency components are displayed simultaneously in a coordinated manner so that a viewer may readily interpret the results of the display. Such a dual spectrum display could provide information about the nature of the incoming signal and its source which would not be determinable from an inspection of the conventional amplitude or power spectrum alone. Thus it might be possible to distinguish among the various kinds of possible sources of radio frequency signals by means of an analysis of the additional information contained in the phase spectrum; for example, it is believed possible by such analysis to determine whether a given microwave signal is produced by a given kind of ultra-high frequency source, such as a klystron, magnetron, backward wave oscillator, etc. In addition phase analysis information may be useful for comparison between actual and theoretically ideal spectra for any given type of electromagnetic oscillation. The present invention provides such a means for analyzing and displaying this useful phase information present in an incoming signal.

In addition to the features and advantages set forth above, it is an objective of the present invention to provide novel spectrum analyzer apparatus for presenting both the amplitude and phase spectra of a complex signal simultaneously on a display in a coordinated manner.

It is a further objective of the present invention to provide means for detecting and analyzing the relative phase differential between the frequency components present in a complex signal.

Further objectives and advantages will be apparent from a consideration of the subsequent description taken in conjunction with the appended drawing in which the figure shows in block diagram form a phase indicating spectrum analyzer constructed according to the principles of the present invention.

Before commencing a description of the elements in the figure and their respective functions, a few words about the definition of "phase" as displayed by an analyzer embodying the principles of the present invention is in order. Phase angles of frequency components present in a complex signal only have meaning when expressed relative to one another. In order to have meaningful significance, a phase angle must be measured relative to either (1) two signals of equal frequency, or (2) between two signals of different frequency at a specified instant in time. In the latter case the phase angle is really the instantaneous angle since the relative phase between two signals of different frequency varies with the beat, i.e., the frequency difference, between them. Consideration of the mathematics of Fourier analysis reveals that phase is there defined as the instantaneous phase angle of each frequency component at that instant in time when T equals zero in accordance with the limits of the Fourier integral, as is well understood by those familiar with such techniques. In Fourier analysis phase is thus determined relative to the fundamental frequency component of the spectrum. As so defined, phase is independent of frequency differences since it is arbitrarily taken at a special time; i.e., when T equals zero, in the signal history.

A conventional spectrum analyzer, which displays the amplitude spectrum of an incoming signal, is not a "real-time" device, and further it performs a new analysis of a given frequency component of the complex waveform on each sweep cycle of the instrument. This frequency analysis does not depend in any way upon the results of the previous sweep and is performed on only one frequency component at a time as the analyzer sweeps through its dispersion range. The amplitude of a given frequency component of the spectrum is measured relative to the center or carrier frequency of the incoming signal. Any complex signal, e.g., a pulse modulated wave may be considered as having a continuous rather than a line spectrum so that there will always be energy present at every frequency component within the dispersion spectrum for the analyzer to operate on. Since each analysis is an independent one it is always performed at T equals zero, and thus the Fourier condition is satisfied. Therefore, phase measurements made through the utilization of a spectrum analysis technique, in accordance with the principles of this invention, will be valid indicia of the phase information present in the incoming signal.

The above described principles will be further understood if reference is now made to the figure which illustrates in block diagram form a spectrum analyzer incorporating means for analyzing and displaying the phase spectrum simultaneously with the conventional amplitude or power spectrum in accordance with the present invention. A microwave frequency spectrum analyzer is shown by way of example, but it is to be understood that the invention is not limited to such frequencies; e.g., acoustical waves may also be phase-analyzed.

A radio frequency signal is fed to the input 10 of the spectrum analyzer and is heterodyned by mixer 11 to convert it to a lower frequency for the facilitation of amplification and other operations to be performed by the remainder of the circuit. The mixer 11 is supplied with a local oscillator signal from the high frequency local oscillator 12. If desired, the high frequency local oscillator 12 may be tunable in frequency so that the spectrum analyzer may be attuned to a desired frequency range.

A preamplifier 13 amplifies the converted signal from the mixer 11 and supplies it to a wide band amplifier 14.

The wide band amplifier 14 also receives a marker signal provided by stabilized oscillator 24 which is tunable in frequency by means of calibrated frequency tuner 25. The signal from the wide band amplifier 14 is then supplied to a second mixer 15. This mixer 15 is supplied also with a frequency swept local oscillator signal from the swept oscillator 16. The manner in which the signal for the swept oscillator 16 is varied in frequency is controlled by a sawtooth wave generator 17 which supplies a sawtooth voltage to control the frequency output of the voltage controllable swept oscillator 16.

Assuming that the output of the mixer 15 is of a frequency equal to the difference between the swept oscillator frequency and the frequency of the output from the wide band amplifier, it will be observed that a signal having a particular frequency supplied to the mixer 15 from the wide band amplifier 14 will appear in the output from the mixer 15 as a signal varying in frequency with time in cyclic fashion at a rate determined by the sawtooth wave generator 17.

The output from the mixer 15 is supplied to a narrow band intermediate frequency amplifier 18 which passes only a limited range of frequencies which may, in a typical case, be on the order of tens of kilocycles centering about a frequency such as 500 kilocycles. Thus at any instant in time only those signals will be accepted which arrive at the mixer 15 within a predetermined range of frequencies on the order of tens of kilocycles such that, when heterodyned with the instantaneous frequency of the swept oscillator 16, they will be accepted by the narrow band amplifier 18 whose passband is centered about the intermediate frequency $f_0=500$ kilocycles; all other signals being effectively rejected.

Furthermore, since the frequency of signals appearing at mixer 15 bears a predetermined relationship to the radio frequency input frequencies at the signal input 10; at any given instant of time, only radio frequency input signals within a narrow predetermined range of frequencies will be passed through the circuit and thus through the narrow band amplifier 18. Furthermore, the center frequency of this range of accepted frequencies will be continuously swept in time at a rate and in a fashion determined by the sawtooth generator 17 and the swept local oscillator 16.

One of the outputs from the narrow band amplifier 18 is applied to a detector and video amplifier circuit 19, which produces a detected signal having an amplitude corresponding to the envelope of the alternating signal output from the narow band amplifier. Thus the output from the detector and video amplifier 19 has at each instant of time an amplitude corresponding to the amplitude (if any) of received radio frequency signals within a narow range of frequencies, and in the course of time this narrow range of sampled frequencies is swept through a larger range of frequencies in sawtooth fashion. The output from the detector and video amplifier circuit 19 is then supplied to one pair of the vertical deflection plates $V_1$ and $V_2$ of a dual beam cathode ray tube 20.

The horizontal deflection plates $H_1$ and $H_2$ of the dual beam cathode ray tube 20 are supplied with a deflection signal from the sawtooth generator 17 which corresponds with the cyclic variation of the acceptance frequency of the spectrum analyzer circuit. In other words, for any position along the horizontal axis (abscissa) of the electron beam of the cathode ray tube 20, there is a corresponding narrow frequency range which will be accepted by the spectrum analyzer to produce a vertical deflection of that electron beam which is deflected by a signal applied to the vertical deflection plates $V_1$ and $V_2$, a deflection corresponding to the amplitude or power of a radio frequency signal within that narrow range.

Thus it will be observed that the portion of the analyzer circuit illustrated and described causes a display to be produced upon one channel of the dual beam cathode ray tube 20 representative of the amplitude or power distribution of the various frequency components supplied to the input of the analyzer apparatus. The circuitry thus far described is conventional and may be found in any one of a number of such spectrum analyzers or, as they are sometimes called panoramic receivers, which are known in the art and are on the market; one such being the Model TSA Spectrum Analyzer sold by the assignee of the present application. It will be understood that the description of the phase indicating spectrum analyzer up until this point has been greatly simplified; however, in view of the conventional nature of the components and the operation of the circuitry thus far described, it is felt that a more detailed explanation would be superfluous.

To continue now with the description of the invention, the output from the narrow band amplifier 18, which is the intermediate frequency $f_0$, which may, for example, be on the order of 500 kilocycles, is applied to each input of two narrow band filters 21 and 31. These filters, which preferably are identical in bandwidth characteristics, may be considered as windows, each of which samples the energy present in any given instant of time in its aperture as determined by its center frequency and bandwidth. Filter 21 has a center frequency slightly greater by an amount $\Delta f$ (which may be equal to, for example, 10 kilocycles) than the intermediate frequency $f_0$ of the narrow band amplifier 18; filter 31 has a corresponding passband centered about a frequency which is lower than the intermediate frequency $f_0$ by the same frequency amount $\Delta f$. Thus, if the intermediate frequency $f_0$ is assumed to be 500 kilocycles and the bandwidth of the narrow band amplifier 18 is assumed to be 30 kilocycles; then filter 21 may have a center frequency of 510 kilocycles and a bandwidth of 10 kilocycles, and filter 31 may have a passband centered at 490 kilocycles with a similar bandwidth of 10 kilocycles. Each narrow filter therefore "sees" a portion of the energy passed by the narrow band intermediate frequency amplifier 18, the filter 21 passing essentially only a portion of the energy contained in those frequencies above the intermediate frequency $f_0$, and the other filter 31 passing essentially only a portion of that energy below the intermediate frequency $f_0$.

The combined average value of the amplitudes of the signals from the respective filters 21 and 31 will then be related to the amplitude of the portion of the spectrum located midway between them, which corresponds to the center frequency of the narrow range of frequencies being accepted by the analyzer, and the difference between the phases of the energies in the two filters will likewise be related to the slope of the phase curve at that midpoint. In other words, each of the filters will have an average phase associated with the energy passed by it and the difference between the average phases of these two filter outputs will be a measure of the differential phase of the energy passing through the narrow band intermediate frequency amplifier 18 at that particular instant in time. Furthermore, if the filters 21 and 31 be made very narrow, with a bandwidth small compared to the bandwidth of the narrow band intermediate frequency amplifier 18, such that the parameter $\Delta f$ can be made very small compared to $f_0$, then the differential output between these two filters 21 and 31 will be very nearly equivalent to the instantaneous phase differential between adjacent frequency components as they are successively sampled by the spectrum analyzer in the course of the sweep through its dispersion range.

The outputs of each of the filters 21 and 31 are connected to respective limiter-amplifiers 22 and 32. Such limiter-amplifier devices are well known circuit elements and, for example, may be of the type shown on page 12–10 of Landee, Davis, and Albrecht, "Electronic Designers' Handbook," McGraw-Hill 1957, or other suitable kind which exhibits good phase response characteristics. A limiter-amplifier is a device which ideally has a constant ratio of output to input voltage for all values of the input signal up to the limiting threshold, and above this point the ratio of the incremental change in the output voltage to an incremental change in the input voltage abruptly assumes a value of zero. If desired, a minimum threshold level may be set into each limiter-amplifier device such that limiting action does not take place on signals which do not exceed a certain threshold value above the noise level. By means of the respective limiter-amplifiers 22 and 32 the output from the narrow filters 21 and 31 are each equalized in amplitude and only phase information is retained. The two signals are then supplied to a phase comparator 40, which may be of the type shown and described on page 368 of Rideout, "Active Networks," Prentice-Hall 1954. The magnitude and polarity of the output of the phase comparator 40 is representative of the differential phase present between the two input signals derived from the window apertures or narrow filters 21 and 31. The output of the phase comparator 40 is then supplied to the box car element 41 which, upon conditioning by a trigger signal in a manner to be explained later, supplies the differentiated phase signal to an integrator 43.

The box car hold device 41 is a well known element in the computer art and has the characteristic that a signal supplied to its input will be held at the output after removal of the input signal until a subsequent conditioning signal occurs whereupon the box car again samples the input for determination of the new output level. Thus the box car is essentially a holding gate which maintains an input level until a new signal arrives conditioning the gate for a new sampling of the input level. Box car 41 is conditioned by signals supplied from trigger generator 42 which is in turn activated by the output of the narrow band amplifier 18. The trigger generator 42 may be any one of the well known types which generates a sharply defined spike or trigger output when the input level exceeds a certain threshold level; for example, a fast firing thyratron or similar device. The trigger generator 42 and the box car gate 41 are preferably included in the embodiment of the invention to accentuate or optimize the output of the phase comparator for analysis purposes. Although these aforementioned items are not necessary for satisfactory operation of the invention they serve, however, to minimize noise level and spurious pickup in the phase analyzing circuit by passing the output of the phase comparator 40 through the box car 41 only when energy exceeding a certain level appears at the output of the narrow band intermediate frequency amplifier 18 as it sweeps through the dispersion range of the instrument.

The output of the phase comparator 40, upon conditioning of the box car gate 41, is supplied to integrator 43 which may be of any suitable type, such as an RC circuit or other type known to those practiced in the art. The integrator 43 preferably has a time constant related to the horizontal sweep speed of the analyzer and, if desired, the circuit parameter determining this time constant may be ganged to the sweep rate of the swept oscillator 16 such that its rate would be varied in the same manner. This is easily accomplished of course by means of ganged potentiometers or variable capacitors. The integrator element 43 is necessary in view of the fact that the output of the phase comparator represents the differential phase rather than the cumulative phase of the frequency component being operated upon by the analyzer at a given instant of time. The output from the integrator 43 is then supplied to a second pair of vertical deflection plates $V_1'$ and $V_2'$ of the dual beam cathode ray tube 20.

It will be noted that the relative phase of the signals from filters 21 and 31 rapidly varies at a rate equal to their frequency difference ($2\Delta f$) in addition to any relative phase difference due to the phase of the input frequency components. The rapid phase variation at a frequency of $2\Delta f$, however, is above the frequency response of integrator 43 and does not interfere with the operation of the apparatus.

In this manner a coordinated display of both the amplitude and phase spectrums of the input signal is presented in a manner from which a viewer can readily derive significant information about the nature of the signal and its source. If desired the phase information alone may be displayed by the use of a conventional single-gun cathode ray tube; however, it is usually preferable to show both amplitude and phase information simultaneously and thus a dual beam disulay means is utilized in the embodiment illustrated. Other known means may be utilized for accomplishing a simultaneous display such as a time-shared single-gun oscilloscope wherein rapid switching from one vertical deflection input channel to another accomplishes (visually at least) the simultaneous display of both information channels. It will be understood that, in the event only a phase analysis spectrum display is desired, the amplitude-analyzing circuitry present in the conventional spectrum analyzer may be eliminated by the simple expedient of switching the unnecessary components out of the circuit.

Numerous variations and modifications to the invention described above will be obvious to those of ordinary skill in the art and in addition to those shown and suggested herein, and accordingly it is desired that the scope of the invention not be limited to the particular embodiment shown or suggested, but rather that it be limited solely by the appended claims in accordance with the patent laws of this nation.

What is claimed is:

1. A spectrum analyzer for analyzing a complex signal, said spectrum analyzer having a frequency selective circuit responsive to a relatively small range of frequencies, frequency sweep means for sweeping said small range of frequenices in time over a larger range of frequencies, means for generating a signal representing the relative phase of frequency component portions of signals instantaneously being swept by said analyzer and means synchronized with said frequency sweep means and responsive to said relative phase signal for providing a phase versus frequency display.

2. A spectrum analyzer as claimed in claim 1 wherein said means for generating a signal representing relative phase comprises means for generating a differential signal which when integrated with respect to time represents the relative phase of frequency component portions of signals supplied to said spectrum analyzer.

3. Apparatus as claimed in claim 2 wherein said means for generating a signal representing relative phase further comprises means for integrating said differential signal and means for rendering said integrating means operative in response to an output from said frequency sweep means.

4. A spectrum analyzer of the type described for analyzing a radio frequency signal, said analyzer comprising a wide band amplifier adapted to receive radio frequency signals, the frequency components of which are to be subjected to frequency spectrum analysis; a mixer circuit connected to receive the output from said wide band amplifier; a frequency swept local oscillator connected to supply a signal to said mixer to heterodyne with the output from said wide band amplifier; intermediate frequency amplifying means connected to receive the output from said mixer and adapted to pass only signals within a limited intermediate frequency range which is narrow compared to the range of frequencies swept by said swept oscillator; detector means connected to receive the output from said intermediate frequency amplifying means and to supply the detected signal to a first vertical deflection means of a display having at least two such vertical deflection means; means for supplying a signal to the horizontal deflection means of said display, said signal being synchronized with the frequency sweep of said swept oscillator; a phase analyzing circuit also connected to said intermediate frequency amplifying means comprising first and second narrow filtering means, said first filtering means having a passband centered at a frequency higher by a predetermined amount than the center frequency of said intermediate frequency amplifying means and said second filtering means having a center frequency lower by said same amount than said intermediate center frequency, limiter-amplifying means connected to the output of each of said filtering means for limiting the respective signal levels, detecting means for comparing the phase differential between the outputs of said limiter-amplifier means, integrating means connected to the output of said phase comparison means and supplying the integrated output to said second vertical deflection means of said display; whereby said combination yields a simultaneous display of the amplitude and relative phase of the various frequency components contained in said radio frequency signal input.

5. A phase indicating spectrum analyzer comprising, a wide band amplifier adapted to receive a radio frequency signal, the frequency components of which are to be subjected to frequency spectrum analysis; a mixer circuit connected to receive the output from said wide band amplifier; a frequency swept local oscillator connected to supply a signal to said mixer to heterodyne with the output from said wide band amplifier; intermediate frequency amplifying means connected to receive the output from said mixer and adapted to pass only signals within a limited frequency range centering about an intermediate frequency which is narrow compared to the range of frequencies swept by said swept oscillator; detector means connected to receive the output from said intermediate frequency amplifying means and to supply the detected signal to a first vertical deflection channel of a display having means for showing information received from at least two vertical deflection channels substantially simultaneously; means for supplying a signal to the horizontal deflection means of said display, said signal being synchronized with the frequency sweep of said swept oscillator; a phase analyzing circuit also connected to said intermediate frequency amplifying means comprising first and second narrow filtering means to each of which is supplied said intermediate frequency signal, said first filtering means having a center frequency higher by a small predetermined amount than said intermediate frequency, said second filtering means having a center frequency which is lower by said same amount from said intermediate frequency, each of said filtering means having connected to the output thereof limiter-amplifier means for limiting the respective signal level from each of said filtering means, phase detecting means for comparing the phase relationship between the respective signal outputs from each of said limiting means and for yielding an output indicative of the polarity and magnitude of said phase differential, integrating means connected to the output of said phase detecting means, and means for supplying the output of said integrator to a second vertical deflection channel of said display; whereby said apparatus simultaneously indicates both the amplitude and relative phase of the frequency components present in said analyzed radio frequency signal.

6. Apparatus as set forth in claim 5 further comprising trigger generating means to which the output of said intermediate frequency amplifying means is also supplied for conditioning a gating means, said gating means having the characteristic of holding at its output the input signal received by said gating element when conditioned by a signal from said trigger generating means until such time as a subsequent trigger signal is received, said gating means being inserted into said apparatus so as to receive the output of said phase detector and to supply said output signal as characterized to said integrating means.

7. Apparatus as set forth in claim 5 wherein said display comprises a cathode ray tube having at least two electron guns for emitting a first and a second electron stream, first vertical deflecting means for varying substantially only the deflection of said first electron stream, second vertical deflection means for varying substantially only said second electron stream, and common horizontal deflection means.

8. A phase spectrum analyzer of the type described for analyzing the phase of a radio frequency signal, said analyzer having a display for indicating the phase relationships of a portion of said radio frequency signal supplied to said analyzer with respect to the frequency of said portion, comprising a wide band amplifier adapted to receive a radio frequency signal, the frequency components of which are to be subjected to phase spectrum analysis; a mixer circuit connected to receive the output from said wide band amplifier; a frequency swept local oscillator connected to supply a signal to said mixer to heterodyne with the output from said wide band amplifier; intermediate frequency amplifying means connected to receive the output from said mixer and adapted to pass only intermediate frequency signals within a limited range which is narrow compared to the range of frequencies swept by said swept oscillator; first and second narrow band filtering means each connected to receive the output from said intermediate frequency amplifying means, said first filtering means having a center frequency which is greater by a small predetermined amount than the center frequency of said intermediate frequency amplifying means, said second filtering means having a center frequency smaller by said same predetermined amount from the center frequency of said intermediate frequency amplifying means, the output of each said filtering means connected to limiter-amplifier means for limiting the magnitude of the respective signal levels; phase detecting means for comparing the relative phase differential between the outputs of said respective limiter-amplifiers; integrating means connected to the output of said phase detector for performing an integration on said differentiated output of said phase detector and for supplying the integrated signal to the vertical deflection means of display means; means for supplying a signal to the horizontal deflection means of said display, said last mentioned signal being synchronized with the frequency sweep of said swept oscillator; whereby the aforesaid combination yields a phase spectrum analysis display of the frequency components of said radio frequency signal.

References Cited in the file of this patent

UNITED STATES PATENTS

| | | |
|---|---|---|
| 1,901,400 | Marrison | Mar. 14, 1933 |
| 2,632,792 | Selz | Mar. 24, 1953 |
| 2,661,419 | Tongue | Dec. 1, 1953 |
| 2,714,663 | Norton | Aug. 2, 1955 |
| 2,774,036 | Dunnington | Dec. 11, 1956 |
| 2,902,644 | McDonald | Sept. 1, 1959 |
| 2,958,822 | Rogers | Nov. 1, 1960 |

FOREIGN PATENTS

| | | |
|---|---|---|
| 1,107,165 | France | Apr. 3, 1955 |